US006934542B2

(12) United States Patent
Ikeda (10) Patent No.: US 6,934,542 B2
(45) Date of Patent: Aug. 23, 2005

(54) SYSTEM FOR MANAGING OPERATION STATUS OF EQUIPMENT AND APPARATUS USED THEREIN

(75) Inventor: Nobuhiro Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 591 days.

(21) Appl. No.: 10/081,052

(22) Filed: Feb. 21, 2002

(65) Prior Publication Data

US 2002/0118974 A1 Aug. 29, 2002

(30) Foreign Application Priority Data

Feb. 27, 2001 (JP) ........................................ 2001-052564

(51) Int. Cl.⁷ ................................................ H04Q 7/20
(52) U.S. Cl. ..................... 455/425; 455/423; 455/67.11
(58) Field of Search ................. 455/423–425, 455/67.11, 67.13, 67.14, 115.1–115.4, 226.1–226.4, 343.2–343.6; 379/1.01, 32.01, 9, 14

(56) References Cited

U.S. PATENT DOCUMENTS

| 5,481,588 A | * | 1/1996 | Rickli et al. ............. 379/32.01 |
| 5,774,759 A | | 6/1998 | Tanaka ........................... 399/8 |
| 6,385,609 B1 | * | 5/2002 | Barshefsky et al. ........... 707/6 |
| 6,621,413 B1 | * | 9/2003 | Roman et al. ......... 340/539.12 |

FOREIGN PATENT DOCUMENTS

EP            0891109 A2 *  1/1999

* cited by examiner

Primary Examiner—Duc Nguyen
(74) Attorney, Agent, or Firm—Morgan & Finnegan, LLP (57) ABSTRACT

To provide a data communications system which makes it possible to know the operation status of equipment without going to the installation location of the equipment.

A management apparatus for notifying a center about the operation status of equipment has an operation status identification management table containing identification numbers which uniquely associate each piece of equipment with its operation statuses. When the management apparatus is notified of the operation status of equipment, it sends a user device such as a user-owned wireless mobile terminal the identification number which corresponds to the reported operation status, from among the registered identification numbers, as calling number information in a call-in message. The user device, which registers calling numbers and operation statuses of equipment to be displayed in advance using a telephone directory function, displays a message indicating the operation status of equipment which corresponds to the calling number contained in the call-in message.

13 Claims, 13 Drawing Sheets

| OCTET | BIT 8 | 7 | 6 | 5 | 4 | 3 | 2 | 1 |
|---|---|---|---|---|---|---|---|---|
| 1 | RESER-VATION | CALL SERVICE TYPE | | | CALL NUMBER (1st NUMBER) | | | |
| 1 | | 1 | 0 | 1 | | | | |
| 2 | CALL NUMBER (2nd NUMBER) | | | | CALL NUMBER (3rd NUMBER) | | | |
| 3 | CALL NUMBER (4th NUMBER) | | | | CALL NUMBER (5th NUMBER) | | | |
| 4 | CALL NUMBER (6th NUMBER) | | | | CALL NUMBER (7th NUMBER) | | | |
| 5 | CALL NUMBER (8th NUMBER) | | | | CALL NUMBER (9th NUMBER) | | | |
| 6 | CALL NUMBER (10th NUMBER) | | | | CALL NUMBER (11th NUMBER) | | | |
| 7 | RESER-VATION | EXTENDED INFOR-MATION IDENTIFI-CATION | CS INTRA-FRAME CODE SERVICE CALL NUMBER | | EXTENDED CALL SERVICE TYPE | | | |
| 7 | | | 0 | 0 | 0 | 1 | 0 | 0 |

FIG. 7

| OCTET | BIT 8 | 7 | 6 | 5 | 4 | 3 | 2 | 1 |
|---|---|---|---|---|---|---|---|---|
| 1 | 0 | 1 | 0 | 1 | 0 | 0 | 0 | 0 |
| 2 | 0 | 0 | 0 | 0 | 0 | 0 | 0 | 0 |
| 3 | 0 | 0 | 0 | 1 | 0 | 0 | 0 | 1 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 1 | 0 | 0 | 0 | 0 | 0 |
| 7 | 0 | 1 | 0 | 0 | 0 | 1 | 0 | 0 |

FIG. 8

| OCTET \ BIT | 8 | 7 | 6 | 5 | 4 | 3 | 2 | 1 |
|---|---|---|---|---|---|---|---|---|
| 1 | 0 | 1 | 0 | 1 | 0 | 0 | 0 | 0 |
| 2 | 0 | 0 | 0 | 1 | 0 | 0 | 1 | 0 |
| 3 | 1 | 0 | 1 | 0 | 0 | 0 | 0 | 0 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 1 | 0 | 1 | 0 | 1 | 0 | 0 |

| IDENTIFICATION NUMBER | OPERATION STATUS |
|---|---|
| 9100 | "COPY MACHINE 1 SUSPENDED" |
| 9110 | "COPY MACHINE 1 AVAILABLE" |
| 9120 | "COPY MACHINE 1 WORKING" |
| 9130 | "COPY MACHINE 1 E etc. |
| 9131 | "COPY MACHINE 1 E PAPER JAM |
| 9132 | "COPY MACHINE 1 E DOUBLE FEED |
| 9133 | "COPY MACHINE 1 E TONER SUPPLY |
| 9200 | "COPY MACHINE 2 SUSPENDED" |
| 9210 | "COPY MACHINE 2 AVAILABLE" |
| 9220 | "COPY MACHINE 2 WORKING" |
| 9230 | "COPY MACHINE 2 E etc. |
| 9231 | "COPY MACHINE 2 E PAPER JAM |
| 9232 | "COPY MACHINE 2 E DOUBLE FEED |
| 9233 | "COPY MACHINE 2 E TONER SUPPLY |
| ⋮ | ⋮ |
| 9832 | "COPY MACHINE 8 E DOUBLE FEED |
| 9833 | "COPY MACHINE 8 E TONER SUPPLY |

FIG. 17 PRIOR ART

SYSTEM FOR MANAGING OPERATION STATUS OF EQUIPMENT AND APPARATUS USED THEREIN

BACKGROUND OF THE INVENTION

1. Field of the Invention

The present invention relates to a system for managing the operation status of equipment such as copy machines and to apparatus used in the system.

2. Related Background Art

Conventionally, for inspection and maintenance services of a copy machine, it is a common practice for a serviceman with expertise to periodically go to the installation location of the copy machine. Recently, however, a remote central management system for copy machines have been used to carry out their inspection and maintenance services from a remote location.

Figure 17:
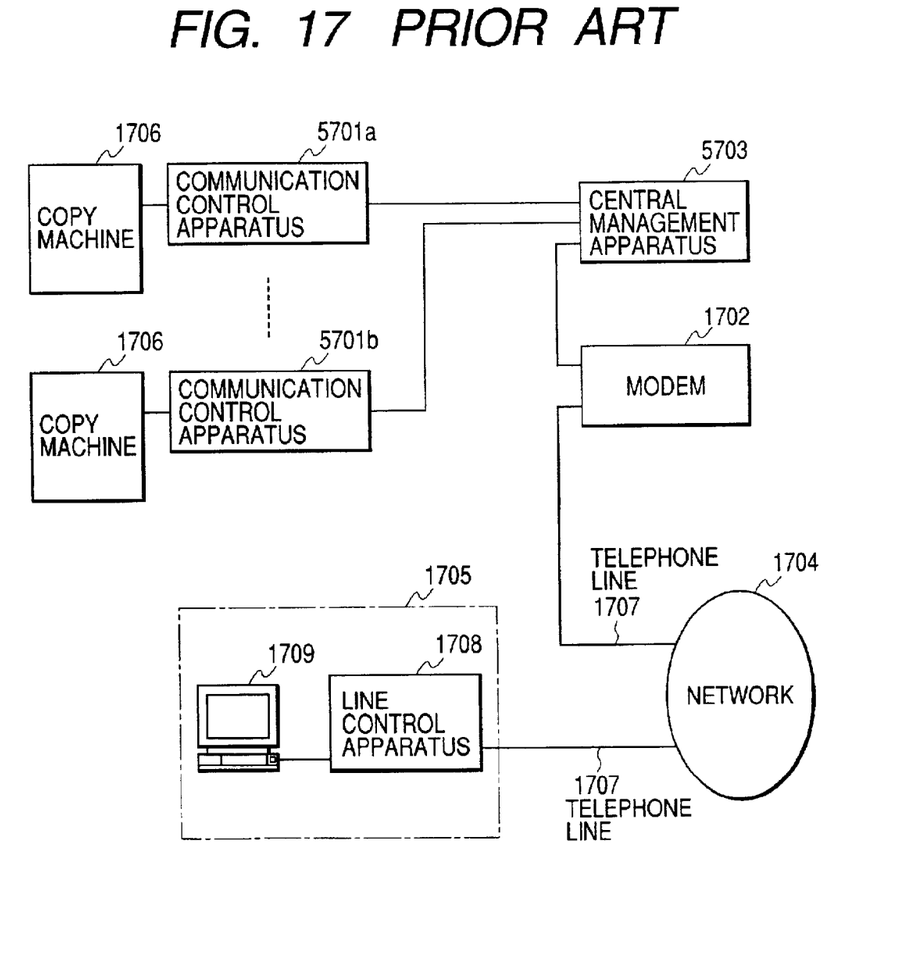
FIG. 17 is a block diagram showing the configuration of a conventional remote central management system for copy machines.

The remote central management system for copy machines will be described with reference to FIG. 17. FIG. 17 is a block diagram showing the configuration of a conventional remote central management system for copy machines.

As shown in FIG. 17, the remote central management system reports error conditions (paper jam, out of toner, etc.) and the like of a copy machine 1706 to a management apparatus 5703 via control apparatus 5701a and 5701b as well as to a management center 1705—which manages various data about error conditions of copy machines—using telephone lines 1707 and a network 1704 via a modem 1702. This configuration allows routine inspection and the like conventionally performed by servicemen to be carried out from a remote location.

On the other hand, the user who uses a copy machine (or other peripheral devices) at office can be told of the operating state (such as Working or Standby) of the copy machine by checking the behavior of the copy machine itself at the installation location of the copy machine.

However, although copy machines have increasingly been used recently, each time a copy machine is used, the user must interrupt the work in progress on purpose and go to the installation location of the copy machine to determine whether the copy machine is available for use by checking its operating status directly. This results in decreased working efficiency.

In the case of minor trouble with a copy machine, such as a low paper, low toner, or paper jam condition, if the use of the remote central management system for copy machines involves bothering to dispatch a serviceman with expertise or making the user take measures upon notification (of the trouble) from the center, the copy machine will not be ready for use when necessary.

SUMMARY OF THE INVENTION

An object of the present invention is to make it possible to know the operation status of equipment without going to the installation location of the equipment.

Another object of the present invention is to make it possible to take measures quickly in case of minor trouble with equipment and keep the equipment ready for use whenever necessary.

Other objects of the present invention will become apparent from the following description taken in connection with the accompanying drawings.

DESCRIPTION OF THE PREFERRED EMBODIMENTS

Embodiments of the present invention will be described below with reference to the drawings.

(First Embodiment)

Figure 1:
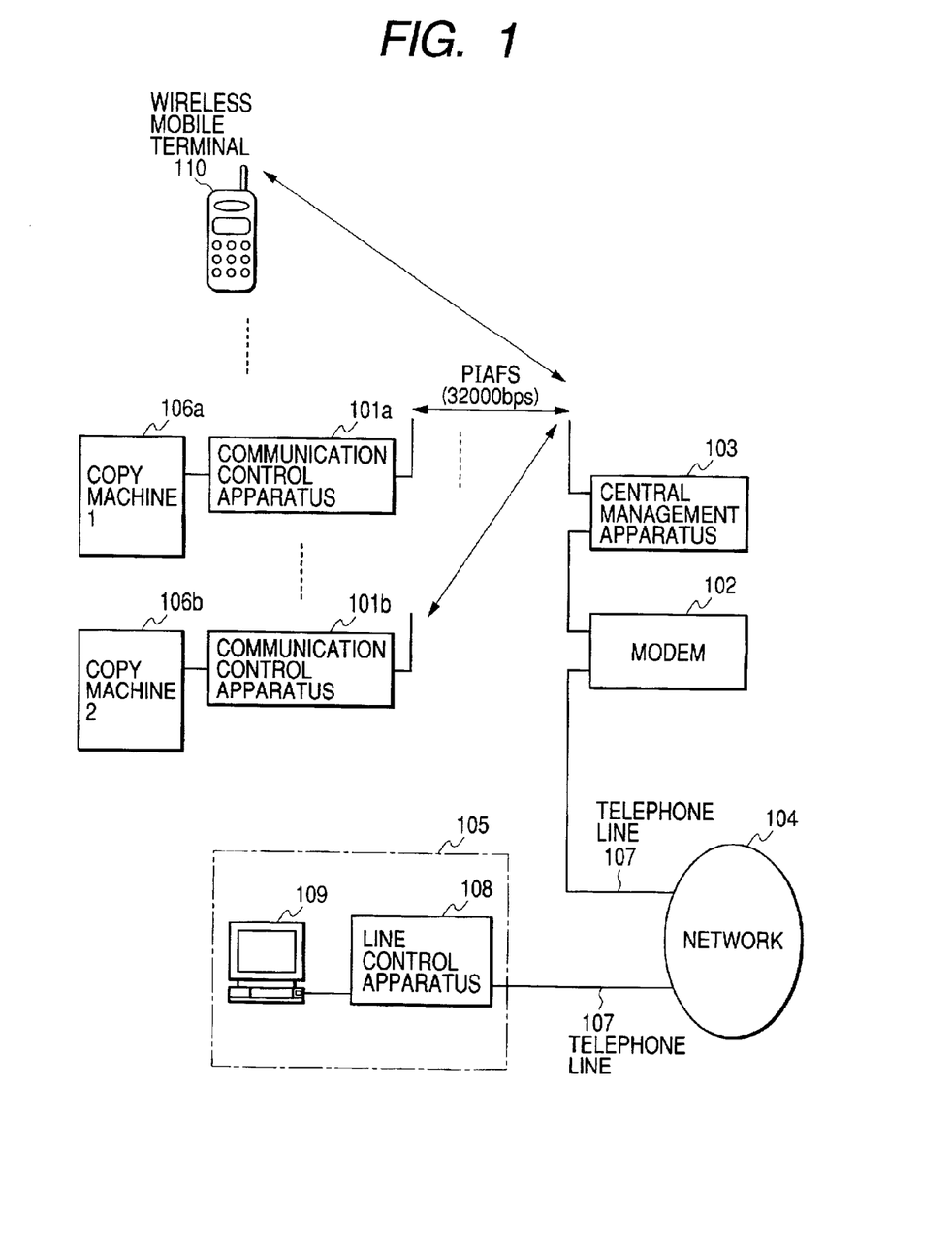
FIG. 1 is a block diagram showing the configuration of a wireless data communications system according to a first embodiment of the present invention.

FIG. 1 is a block diagram showing the configuration of a wireless data communications system according to a first embodiment of the present invention.

As shown in FIG. 1, the wireless data communications system comprises a central management apparatus 103 connected to a network 104 and equipped with wireless base station capabilities to accommodate a plurality of lines; a plurality of wireless mobile terminals 110 covered by the central management apparatus 103; and a plurality of communication control apparatus 101a, 101b, . . . covered by the central management apparatus 103 and equipped with wireless mobile station capabilities, wherein the plurality of wireless mobile terminals 110 are connected with copy machines 106a, 106b, . . . Hereinafter, the communication control apparatus 101a, 101b, . . . and the copy machines 106a, 106b, . . . will be referred to collectively as the communication control apparatus 101 and copy machine 106, respectively, unless otherwise stated.

The wireless data communications system has two routes: a reporting route from the copy machines 106 to a management center 105 along which error conditions (paper jam, out of toner, etc.) and the like of the copy machines 106 connected to the communication control apparatus 101 are reported from the communication control apparatus 101 to the central management apparatus 103 using wireless data communications in accordance with the PIAFS (PHS Internet access forum standard) communications protocol and are reported further to the management center 105—which manages various data about error conditions of copy machines—using telephone lines 107 and a network 104 via a modem; and a route along which various inquiries and configuration data are sent from the management center 105 to the copy machines 106. The central management apparatus 103 uses these routes to report various error information and management information of copy machines to the management center 105 as well as to make various settings based on answers to inquiries and configuration data received from the management center 105.

Furthermore, in addition to information about error conditions (paper jam, out of toner, etc.) of the copy machines 106, the wireless data communications system reports information about the operation status of the copy machines 106, including their operating state (such as Working or Standby), from the central management apparatus 103 to the wireless mobile terminals 110, allowing the wireless mobile terminals 110 to keep track of the condition of the copy machines 106 in real time.

In order to build the present system, all the communication control apparatus 101a, b and wireless mobile terminals 110 managed by the central management apparatus 103 must be registered as subscribers with the central management apparatus 103.

Figure 2:
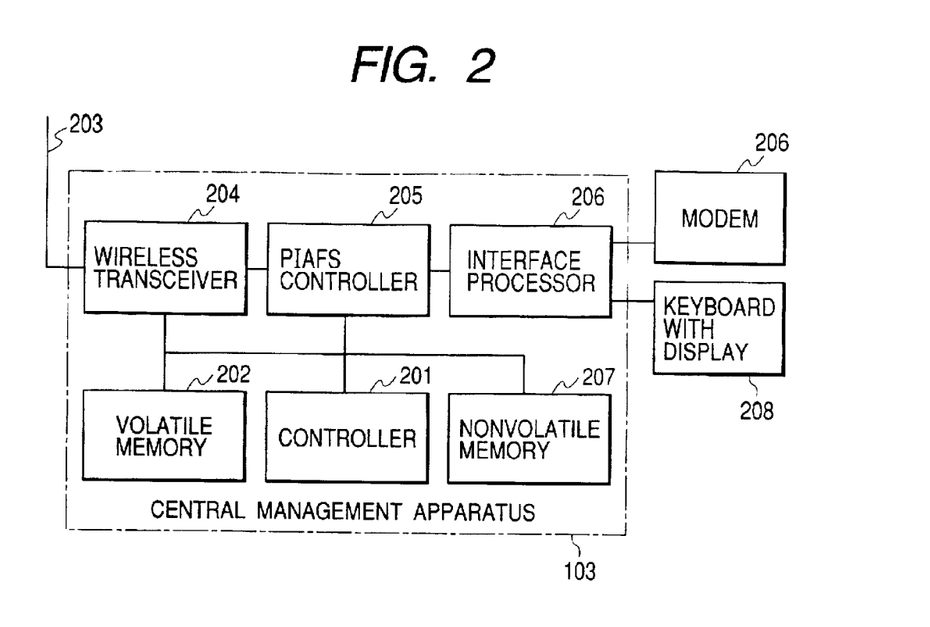
FIG. 2 is a block diagram showing the configuration of the central management apparatus 103 shown in FIG. 1.
Figure 12:
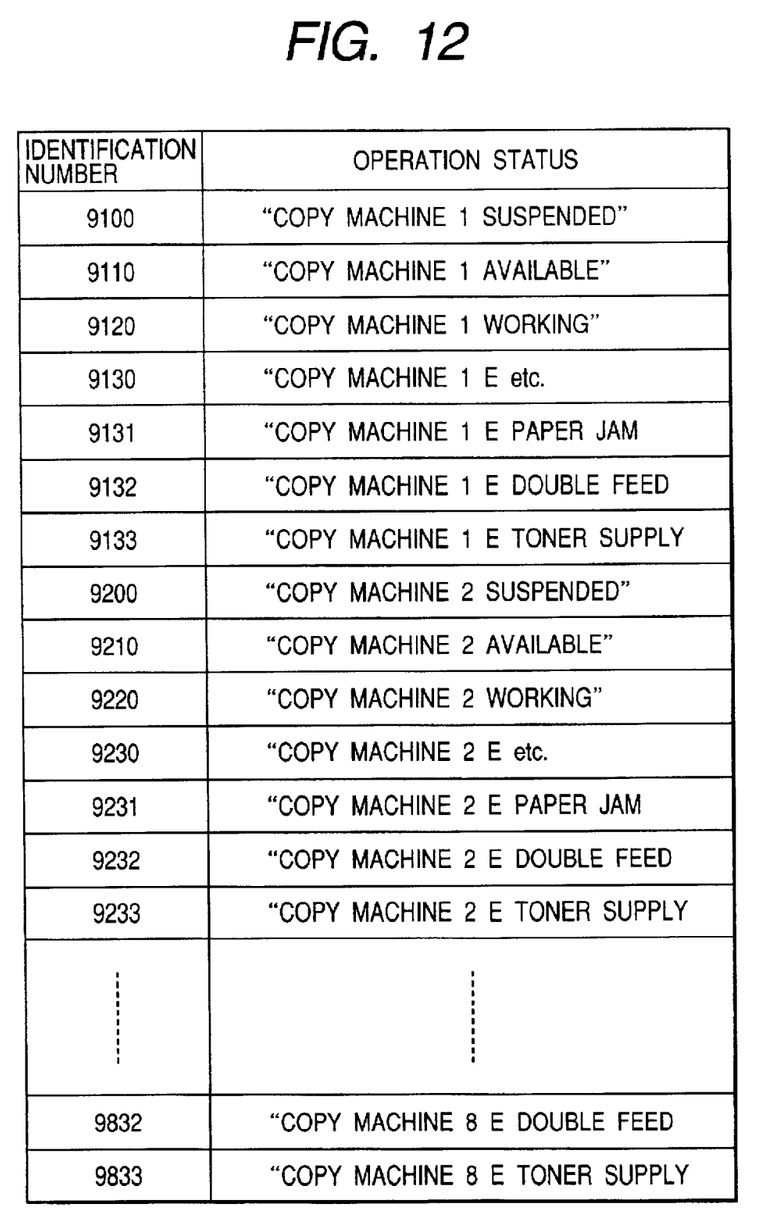
FIG. 12 is a diagram showing the configuration of an operation status identification management table stored in a volatile memory of the central management apparatus.

Next, the configuration of the central management apparatus 103 will be described with reference to FIGS. 2 and 12. FIG. 2 is a block diagram showing the configuration of the central management apparatus 103 shown in FIG. 1 while FIG. 12 is a diagram showing the configuration of an operation status identification management table stored in a volatile memory of the central management apparatus shown in FIG. 1.

As shown in FIG. 2, the central management apparatus 103 consists of a wireless transceiver 204 for sending and receiving various data by radio to/from the communication control apparatus 101 via an antenna 203, PIAFS controller 205 for PIAFS protocol conversion of the sent and received data, interface processor 206 for connecting with the modem 102 and a keyboard (with a display) 208, volatile memory 202, controller 201, and nonvolatile memory 207. The volatile memory 202 stores the operation status identification management table used for operation status display control described later. As shown in FIG. 12, the operation status identification management table contains screen messages which have been registered via a telephone directory function or the like and which represent the operation status of individual copy machines 106. Each of the screen messages represent a copy machine (106) and its operation status uniquely. They have been registered, being associated with respective identification numbers (calling number information). The controller 201 controls the entire central management apparatus according to a control program and data stored in the nonvolatile memory 207.

Figure 3:
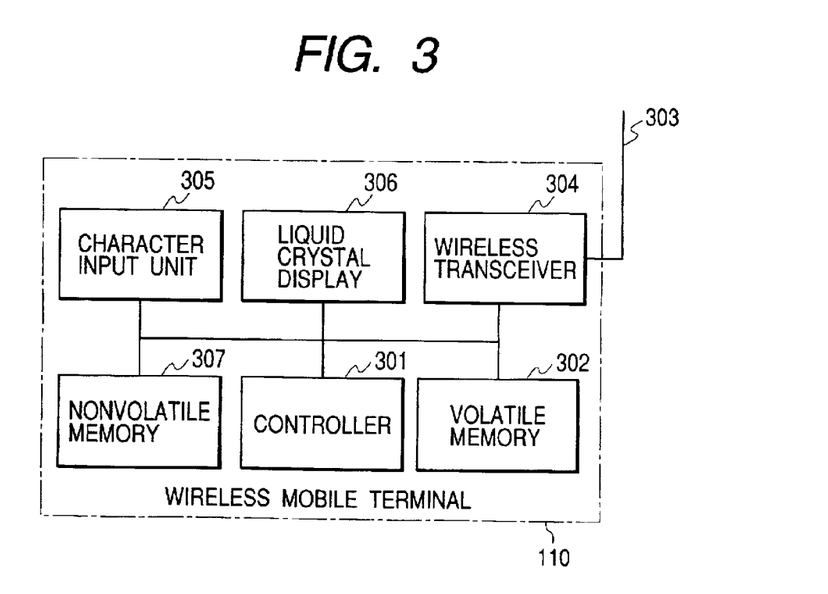
FIG. 3 is a block diagram showing the configuration of the wireless mobile terminal 110 shown in FIG. 1.

Next, the configuration of the wireless mobile terminal 110 will be described with reference to FIG. 3. FIG. 3 is a block diagram showing the configuration of the wireless mobile terminal 110.

As shown in FIG. 3, the wireless mobile terminal 110 consists of a wireless transceiver 304 for sending and receiving various data by radio to/from the central management apparatus 103 via an antenna 303, character input unit 305 for entering character information such as telephone directory data, liquid crystal display 306 for displaying character information such as telephone directory data, volatile memory 302, controller 301, and nonvolatile memory 307. The volatile memory 302 stores the same table as the operation status identification management table (FIG. 12) described above. In other words, in the volatile memory 302, screen messages which uniquely represent respective copy machines 106 and their operation statuses have been registered, being associated with respective identification numbers (calling number information). The controller 301 controls the entire wireless mobile terminal 110 according to a control program and data stored in the nonvolatile memory 307.

Incidentally, the content of the operation status identification management table stored in the volatile memory 302 may be telephone directory data entered via the character input unit 305 or telephone directory data transmitted from the central management apparatus 103 by radio. Besides, it is also possible to register data sent from the central management apparatus 103 via a hard-wired connection which allows the wireless mobile terminal 110 to be connected to the central management apparatus 103 by wire.

Figure 4:
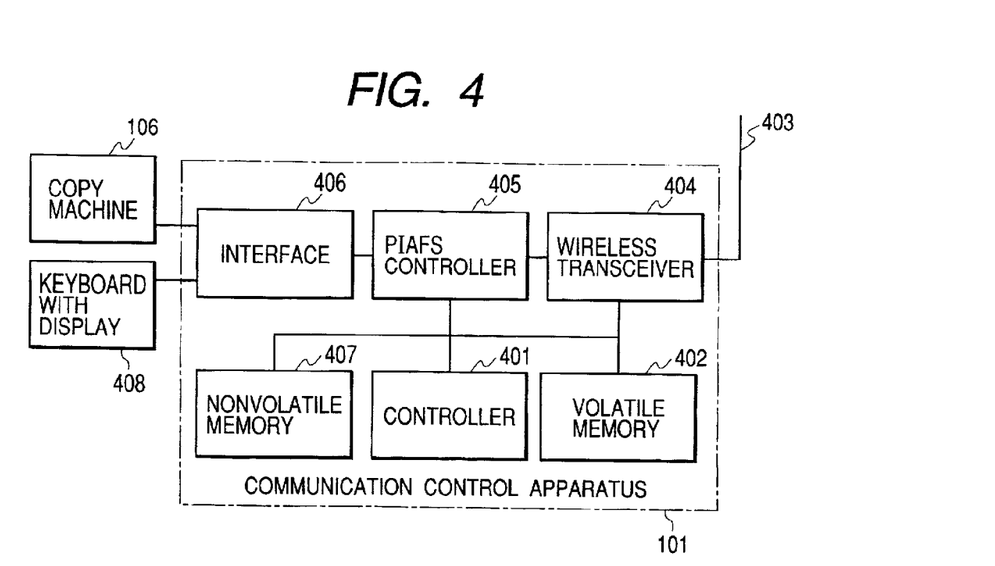
FIG. 4 is a block diagram showing the configuration of the communication control apparatus 101 shown in FIG. 1.

Next, the configuration of the communication control apparatus 101 (101a, 101b, . . . ) will be described with reference to FIG. 4. FIG. 4 is a block diagram showing the configuration of the communication control apparatus 101 shown in FIG. 1.

As shown in FIG. 4, each of the communication control apparatus 101 (101a, 101b, . . . ) consists of a wireless transceiver 404 for sending and receiving various data by radio to/from the central management apparatus 103 via an antenna 403, PIAFS controller 405 for PIAFS protocol conversion of the sent and received data, interface 406 for connecting with the copy machine 106 and a keyboard (with a display) 408, volatile memory 402, controller 401, and nonvolatile memory 407. The controller 401 controls the entire communication control apparatus according to a control program and data stored in the nonvolatile memory 407.

Figure 5:
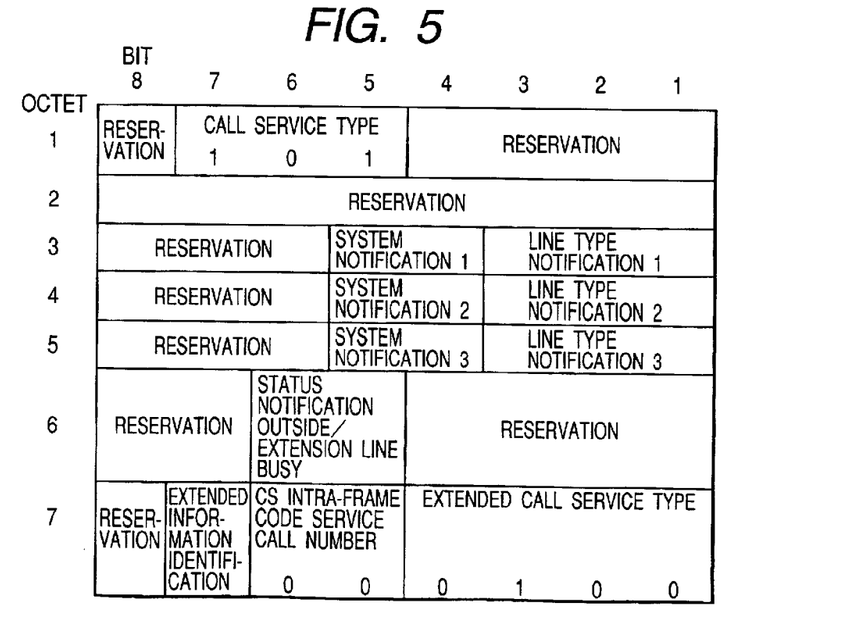
FIG. 5 is a diagram showing the structure of a message format when the type of an extended call service sent as a call-in message from the central management apparatus 103 to the wireless mobile terminal 110 is CS added service.
Figure 7:
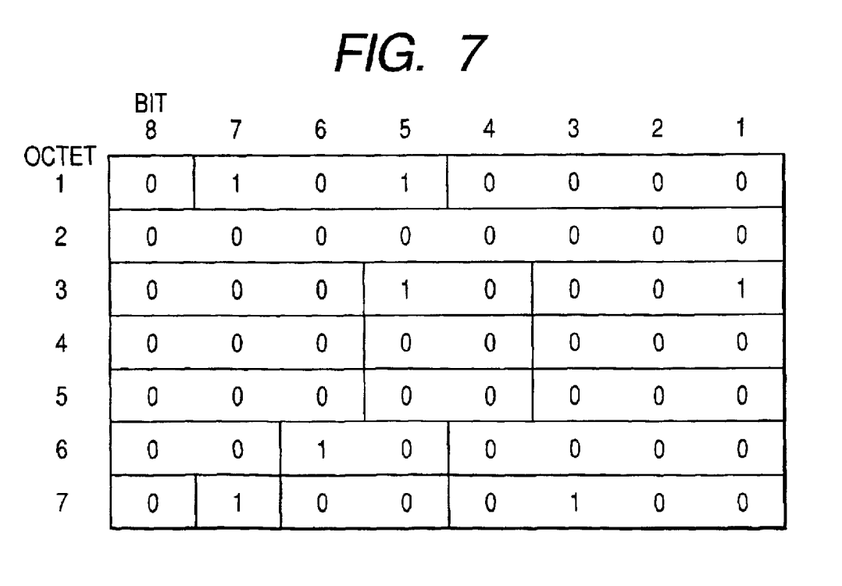
FIG. 7 is a diagram showing the result of decoding the call-in message shown in FIG. 5.
Figure 8:
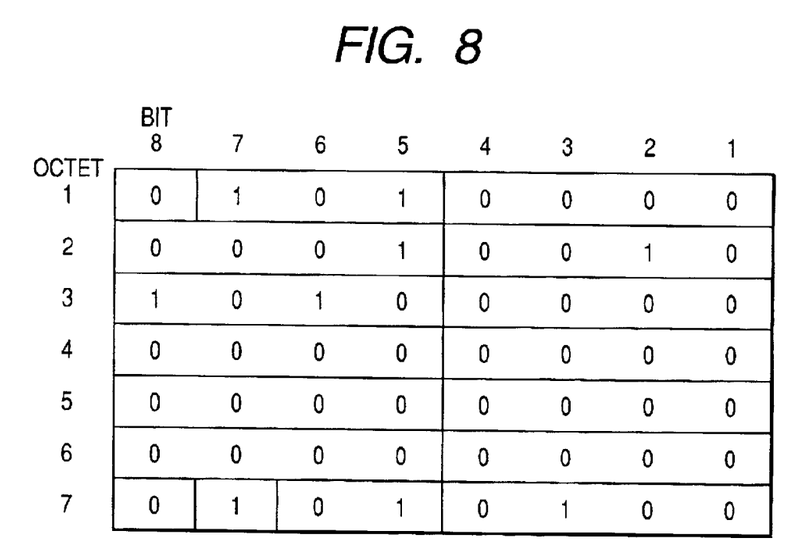
FIG. 8 is a diagram showing the result of decoding the call-in message shown in FIG. 6.
Figure 10:
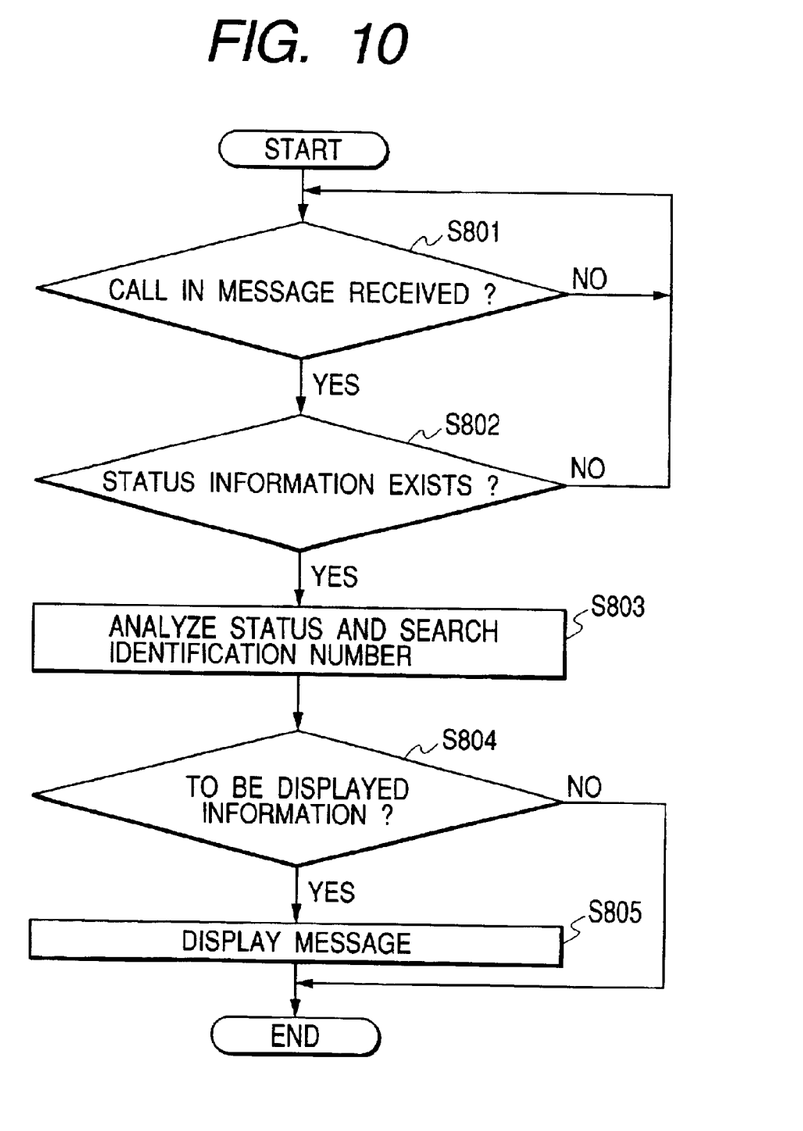
FIG. 10 is a flowchart of processes performed on the side of the wireless mobile terminal 110 to implement the operation status notification function of the copy machine 106.
Figure 11:
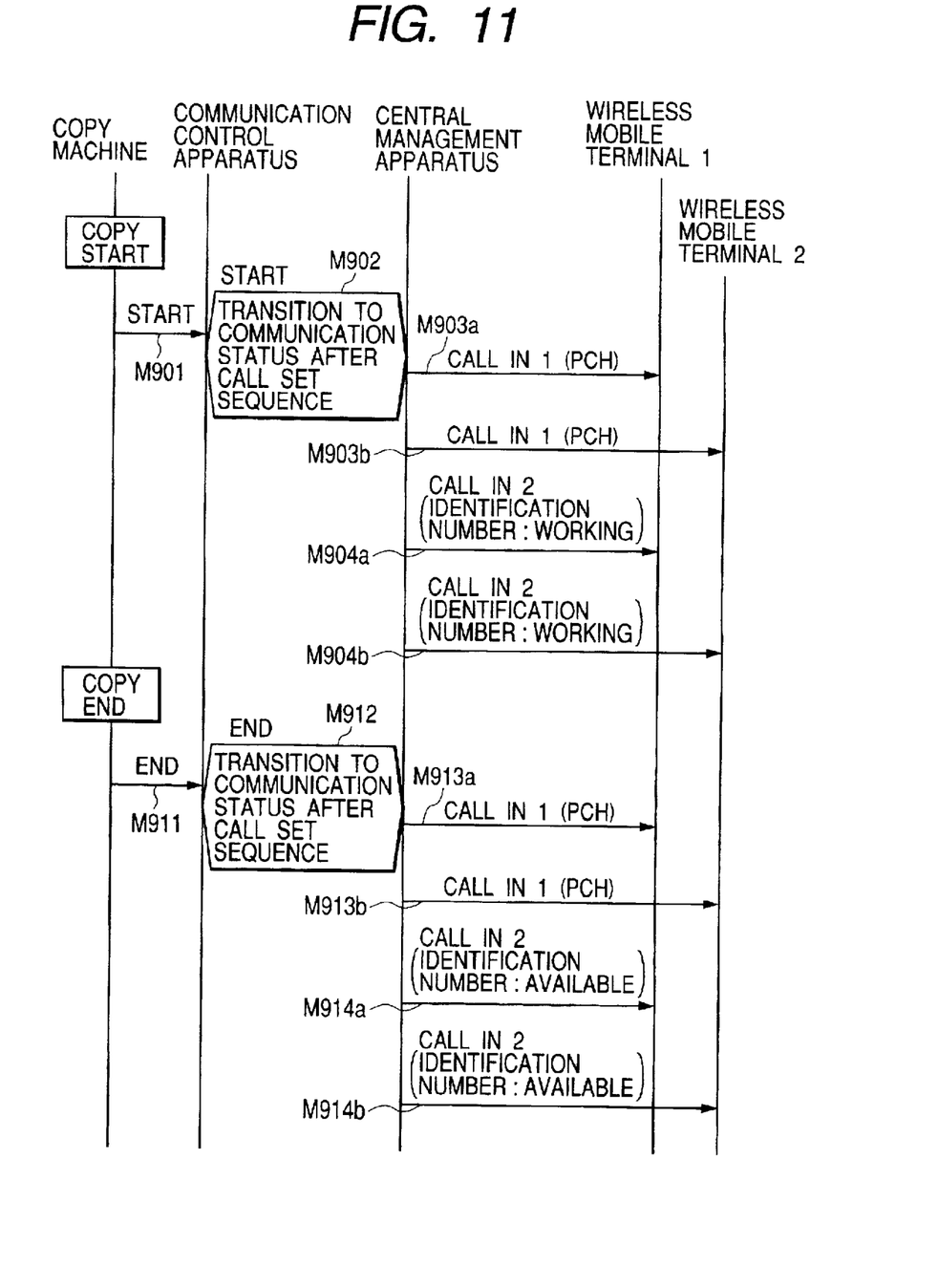
FIG. 11 is a diagram showing a sequence of the operation status notification function of the copy machine 106.
Figure 13:
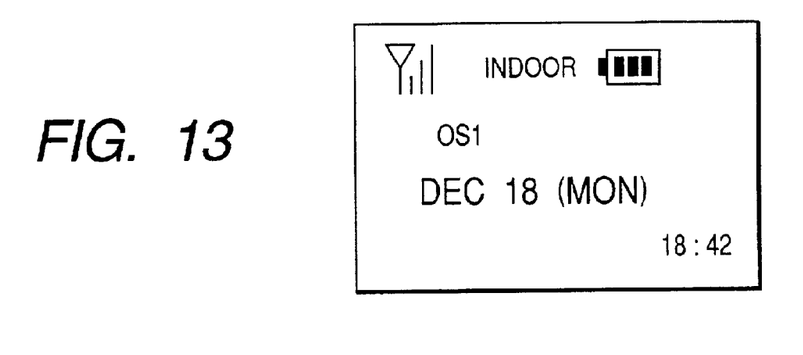
FIG. 13 is a diagram showing an example of a Standby screen on the wireless mobile terminal 110.
Figure 14A:
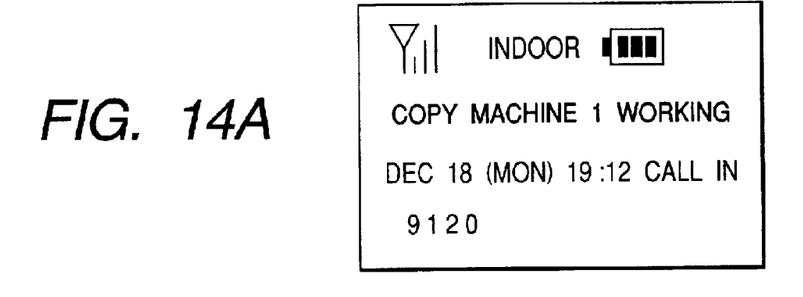
FIGS. 14A and 14B are diagrams showing an example of a Copy Machine Operation Status Display screen on the wireless mobile terminal 110.
Figure 14B:
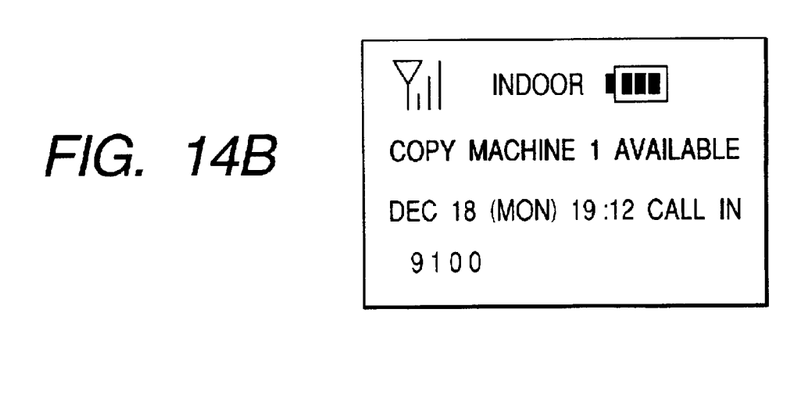

Next, an operation status notification function of the copy machine 106 according to this embodiment will be described with reference to FIGS. 5 to 11, 13, and 14. FIG. 5 is a diagram showing the structure of a message format when the type of an extended call service sent as a call-in message from the central management apparatus 103 to the wireless mobile terminal 110 in the wireless data communications system shown in FIG. 1 is CS added service, FIG. 6 is a diagram showing the structure of a format when call number information for extended information identification is contained in a call-in message sent from the central management apparatus 103 to the wireless mobile terminal 110 in the wireless data communications system shown in FIG. 1, FIG. 7 is a diagram showing the result of decoding the call-in message shown in FIG. 5, FIG. 8 is a diagram showing the result of decoding the call-in message shown in FIG. 6, FIG. 9 is a flowchart of processes performed on the side of the central management apparatus 103 to implement the operation status notification function of the copy machine 106 in the wireless data communications system shown in FIG. 1, FIG. 10 is a flowchart of processes performed on the side of the wireless mobile terminal 110 to implement the operation status notification function of the copy machine 106 in the wireless data communications system shown in FIG. 1, FIG. 11 is a diagram showing a sequence of the operation status notification function of the copy machine 106 in the wireless data communications system shown in FIG. 1, FIG. 13 is a diagram showing an example of a Standby screen on the wireless mobile terminal 110 in the wireless data communications system shown in FIG. 1, FIGS. 14A and 14B are diagrams showing an example of a Copy Machine Operation Status Display screen on the wireless mobile terminal 110 in the wireless data communications system shown in FIG. 1.

The copy machine 106 notifies the communication control apparatus 101 it is connected to about any change in its operation status. For example, when the copy machine 106a connected to the communication control apparatus 101a is started, the copy machine 106a (copy machine 1) sends start-up notification M901 to the communication control apparatus 101a as shown in FIG. 11. Upon receiving operation status change notification in the form of the start-up notification M901 from the copy machine 106a (copy machine 1) it is connected with, the communication control apparatus 101a starts a call set sequence to establish a wireless link with the central management apparatus 103 and makes transition to Communicating status. After the transition to the Communicating status, the communication control apparatus 101a sends start-up notification M902, which is a notification about the change in the operation status of the copy machine 106a (copy machine 1), to the central management apparatus 103 via data communications using the PIAFS protocol.

Figure 9:
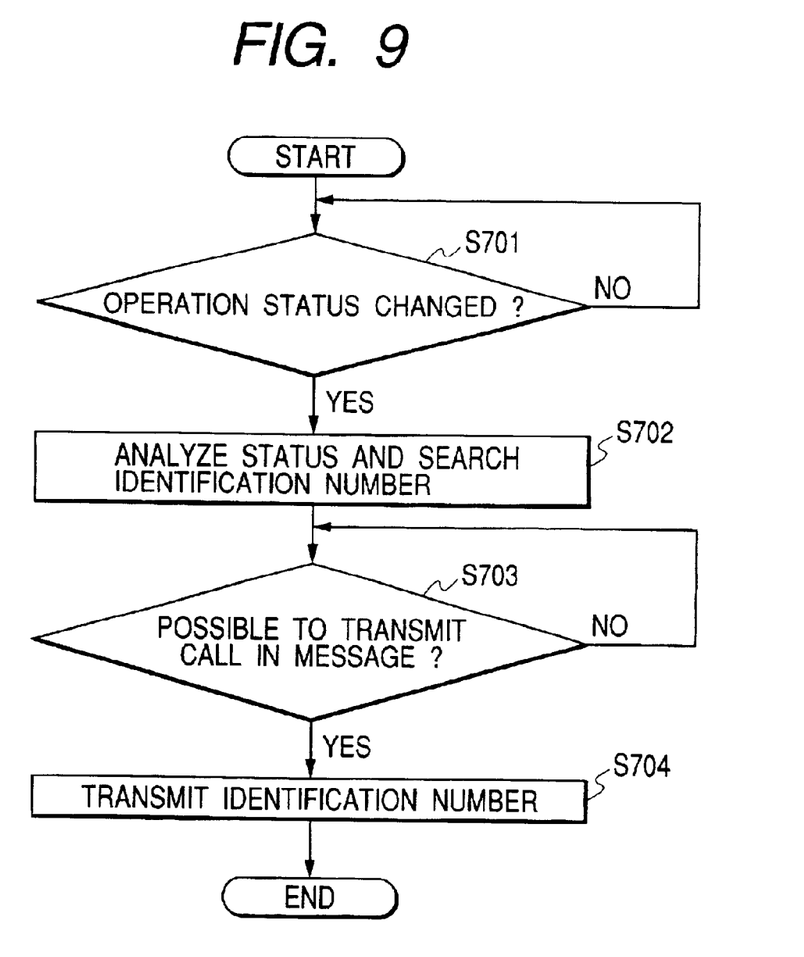
FIG. 9 is a flowchart of processes performed on the side of the central management apparatus 103 to implement an operation status notification function of a copy machine 106.

As shown in FIG. 9, the central management apparatus 103 monitors for notification about a change in the operation status of the copy machine 106 (Step S701), and upon receiving operation status change notification, it searches the operation status identification management table (FIG. 12) stored in the volatile memory 202 for the identification number which represents the appropriate operation status (Step S702). If start-up notification M902 is received as the notification about a change in the operation status of the copy machine 106a (copy machine 1), then based on this start-up notification M902, the central management apparatus 103 searches the operation status identification management table stored in the volatile memory 202 for identification number "9120" which represents the appropriate operation status. Specifically, it searches for "Copy Machine 1: Working."

Figure 6:
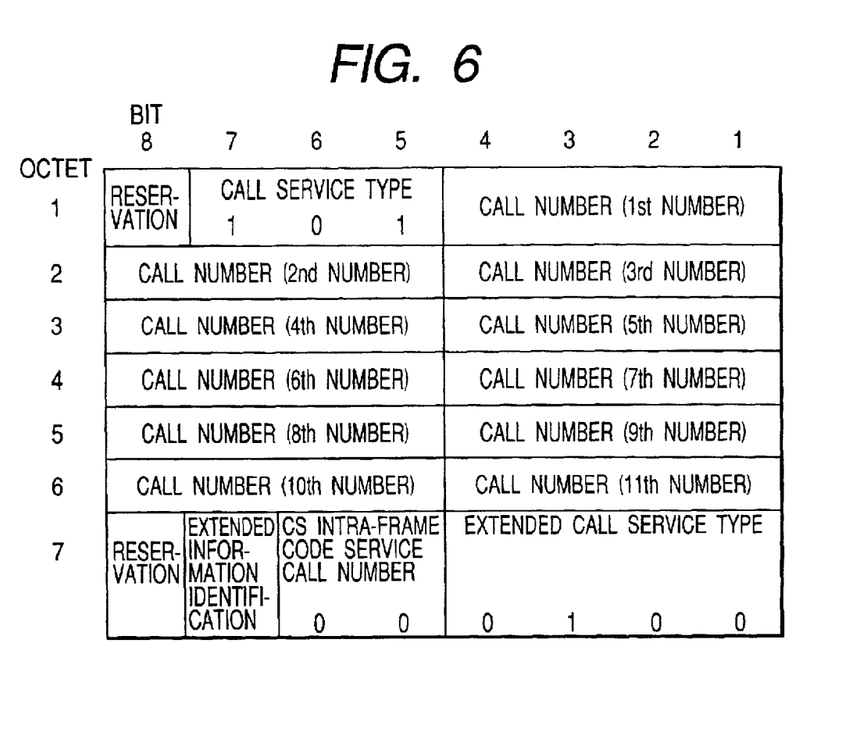
FIG. 6 is a diagram showing the structure of a format when call number information for extended information identification is contained in call-in message sent from the central management apparatus 103 to the wireless mobile terminal 110.

Then, the central management apparatus 103 waits for the right time to send a call-in message, which is an information signal (Step S703), and when the right time comes, it sends the call-in message M903a (message in the message format used when the extended call service type in FIG. 5 is the CS added service) and the call-in message M904a (message in the message format used when call number information for extended information identification exists in FIG. 6) to the registered wireless mobile terminal 110 (wireless mobile terminal 1) (Step S704). The call-in messages are the identification information retrieved in Step S702 and are sent as calling number information (identification information "9120," in this case). Actually, the transmission process of the call-in messages M903a and M904a described above is repeated several times. The call-in message M903a is coded as shown in FIG. 7 and the call-in message M904a is coded as shown in FIG. 8 before they are transmitted. The call-in messages (M903a and M904a) are also transmitted to the other wireless mobile terminals 110 (wireless mobile terminal 2, etc). Incidentally, the call-in messages shown in FIGS. 5 to 8 are used when the copy machines are available as described later.

Before receiving the call-in messages described above (for example, M903a and M904a), the wireless mobile terminals 110 are in a Standby status, in which the liquid crystal display 306 displays a Standby screen shown in FIG. 13.

As shown in FIG. 10, if the wireless mobile terminal 110 receives a call-in message in the Standby status (Step S801), it judges whether the received call-in message is a call-in message (M903a or M904a) which contains operation status information (an identification number) (Step S802). If operation status information in the form of an identification number (for example, "9120") is contained, the operation status identification management table (FIG. 12) stored in the volatile memory 302 is searched for a message to be displayed which corresponds to the identification number described above (Step S803).

Then, it is judged whether the identification number belongs to the copy machine 106a (copy machine 1) whose operation status is requested to be displayed by the user of the wireless mobile terminal 110 (Step S804). If it does, a message "Copy Machine 1: Working" and the identification number are displayed on the liquid crystal display 306, for example, as shown in FIG. 14A (Step S805).

When the copy machine 106a (copy machine 1) finishes copying, the communication control apparatus 101a is notified of the end of machine operation M911 as operation status change notification as shown in FIG. 11. Upon receiving the operation status change notification in the form of the end notification M911 from the copy machine 106a (copy machine 1) it is connected with, the communication control apparatus 101a starts a call set sequence to establish a wireless link with the central management apparatus 103 and makes transition to Communicating status. After the transition to the Communicating status, the communication control apparatus 101a sends end notification M912, which is a notification about a change in the operation status of the copy machine 106a (copy machine 1), to the central management apparatus 103 via data communications using the PIAFS protocol.

Upon receiving the end notification M912, the central management apparatus 103 searches the operation status identification management table (FIG. 12) stored in the volatile memory 202 for the appropriate identification number (9110) (Step S702), based on the end notification M912.

Then, when the right time comes to send out a call-in message (Step S703), the central management apparatus 103 sends the call-in message M913a (FIG. 5) and call-in message M914a (FIG. 6) to the wireless mobile terminal 110 (Step S704). The call-in messages are the identification information retrieved in Step S702 and are sent as calling number information (identification information "9110," in this case). The transmission process of the call-in messages M913a and M914a described above is repeated several times. The call-in message M913a is coded as shown in FIG. 7 and the call-in message M914a is coded as shown in FIG. 8 before they are transmitted. The call-in messages (M913a and M914a) are transmitted similarly to the other wireless mobile terminals.

Before receiving the call-in messages described above (for example, M913a and M914a), the wireless mobile terminals 110 are in a Standby status, and thus the liquid crystal display 306 displays a Standby screen shown in FIG. 13.

Upon receiving the call-in message, the wireless mobile terminal 110 judges whether the received call-in message is a call-in message (M913a or M914a) which contains operation status information (an identification number) (Step S802). If operation status information in the form of an identification number (9110) is contained, the operation status identification management table (FIG. 12) stored in the volatile memory 302 is searched for a message to be displayed which corresponds to the identification number described above (Step S803).

Then, it is judged whether the identification number belongs to the copy machine 106a (copy machine 1) whose operation status is requested to be displayed by the user of the wireless mobile terminal 110 (Step S804). If it does, a message "Copy Machine 1: Available" and the identification number are displayed on the liquid crystal display 306, for example, as shown in FIG. 14B (Step S805).

Regarding operation status information, the latest status of any other copy machine 106 can be checked with reference to the received-call history of the appropriate wireless mobile terminal 110.

Similarly, if a copy machine 106 is turned off or an error such as paper jam or out-of-toner condition occurs, the copy machine 106 notifies the communication control apparatus 101 of that effect. The communication control apparatus 101 forwards the notification to the central management apparatus 103. Then, while forwarding the notification to the management center 105, the central management apparatus 103 searches for identification information which corresponds to the content of the notification and sends a call-in message to the wireless mobile terminal 110 using the retrieved identification information as calling number information. Upon receiving the call-in message, the wireless mobile terminal 110 displays a message which corresponds to the identification information contained in the call-in message.

In this way, according to this embodiment, identification numbers uniquely associated with operation statuses of each copy machine 106 are registered in advance. Upon a change in operation status of the copy machine 106, from among the registered identification numbers, the appropriate identification number is sent to the wireless mobile terminals 110 as calling number information in the call-in message during general call pickup by PHS. Since a message is displayed on the liquid crystal display 306 of the wireless mobile terminal 110, indicating the operation status of the copy machine which corresponds to the calling number information, the user carrying the wireless mobile terminal 110 does not need to interrupt the work in progress on purpose and go to the installation location of the copy machine 106 to check directly whether the copy machine 106 is available. This results in improved working efficiency.

Also, since the user can take measures quickly in case of minor trouble such as a low paper, low toner, or paper jam condition, the copy machine 106 is ready for use whenever necessary, resulting in improved working efficiency.

Furthermore, the wireless mobile terminal 110 only needs to be equipped with a typical telephone directory function, and the wireless data communications system of the present invention can be constructed easily without the need for a new wireless mobile terminal 110 equipped with special functions. This makes it possible to construct a system with a good cost performance in terms of capital investment.

(Second Embodiment)

Figure 15:
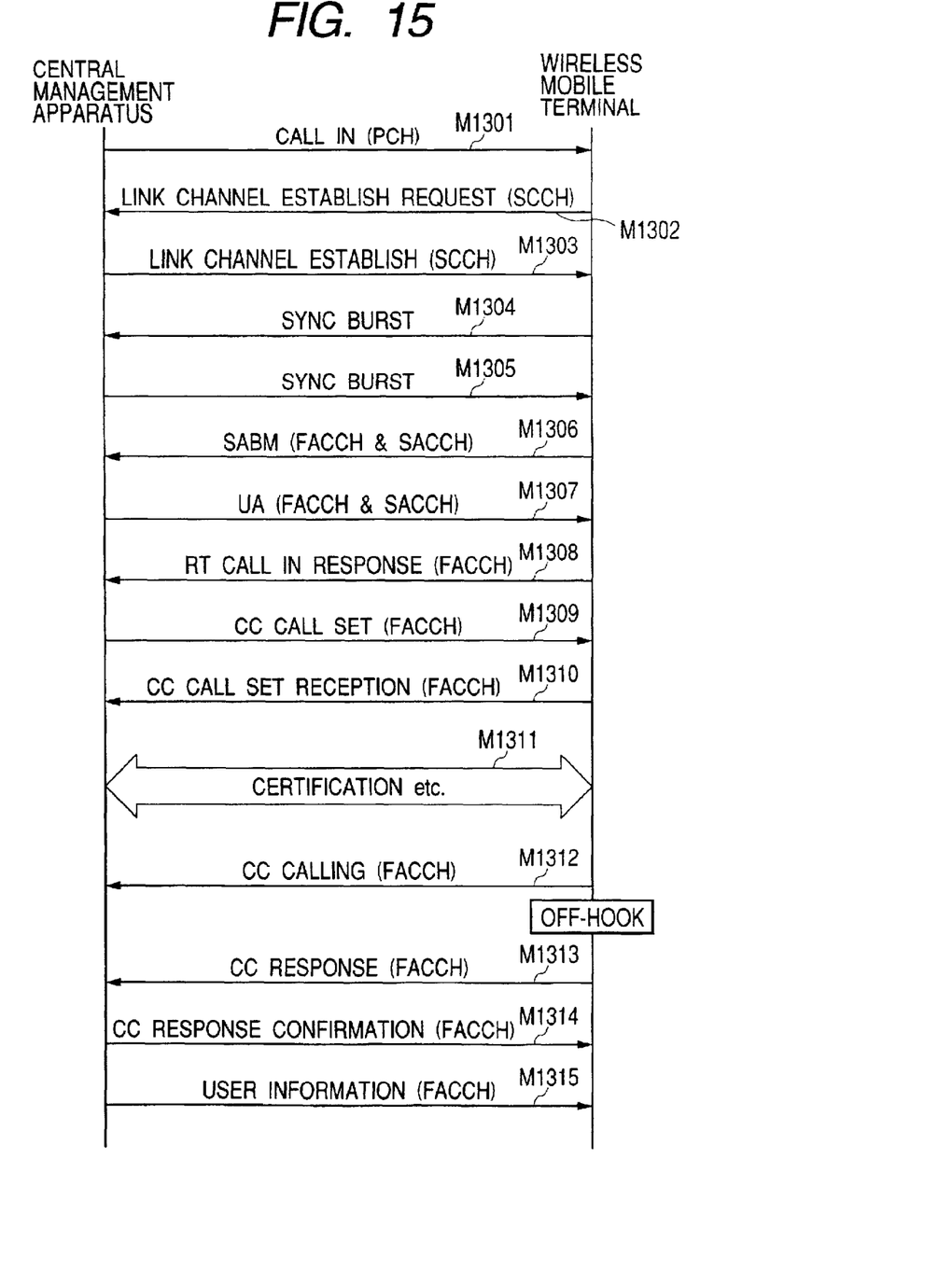
FIG. 15 is a diagram showing a sequence of an operation status notification function of a wireless data communications system according to a second embodiment of the present invention.

Next, a second embodiment of the present invention will be described with reference to FIGS. 15 and 16. FIG. 15 a diagram showing a sequence of an operation status notification function of a wireless data communications system according to the second embodiment of the present invention while FIG. 16 is a flowchart of processes performed by a central management apparatus to implement the operation status notification function of the wireless data communications system according to the second embodiment of the present invention.

According to the first embodiment described above, the central management apparatus 103 sends a call-in message containing operation status information (an identification number) to the wireless mobile terminals 110 upon detecting a change in the operation status of the copy machine 106. However, according to the second embodiment, in addition to performing the processes of the first embodiment described above, the central management apparatus 103 sends the operation status information to a wireless mobile terminal 110 at the time when the given wireless mobile terminal 110 is registered in the service area of the central management apparatus 103, i.e., after the central management apparatus 103 confirms that the location of the wireless mobile terminal 110 has been registered and also that the operation status information has not been transmitted yet.

Figure 16:
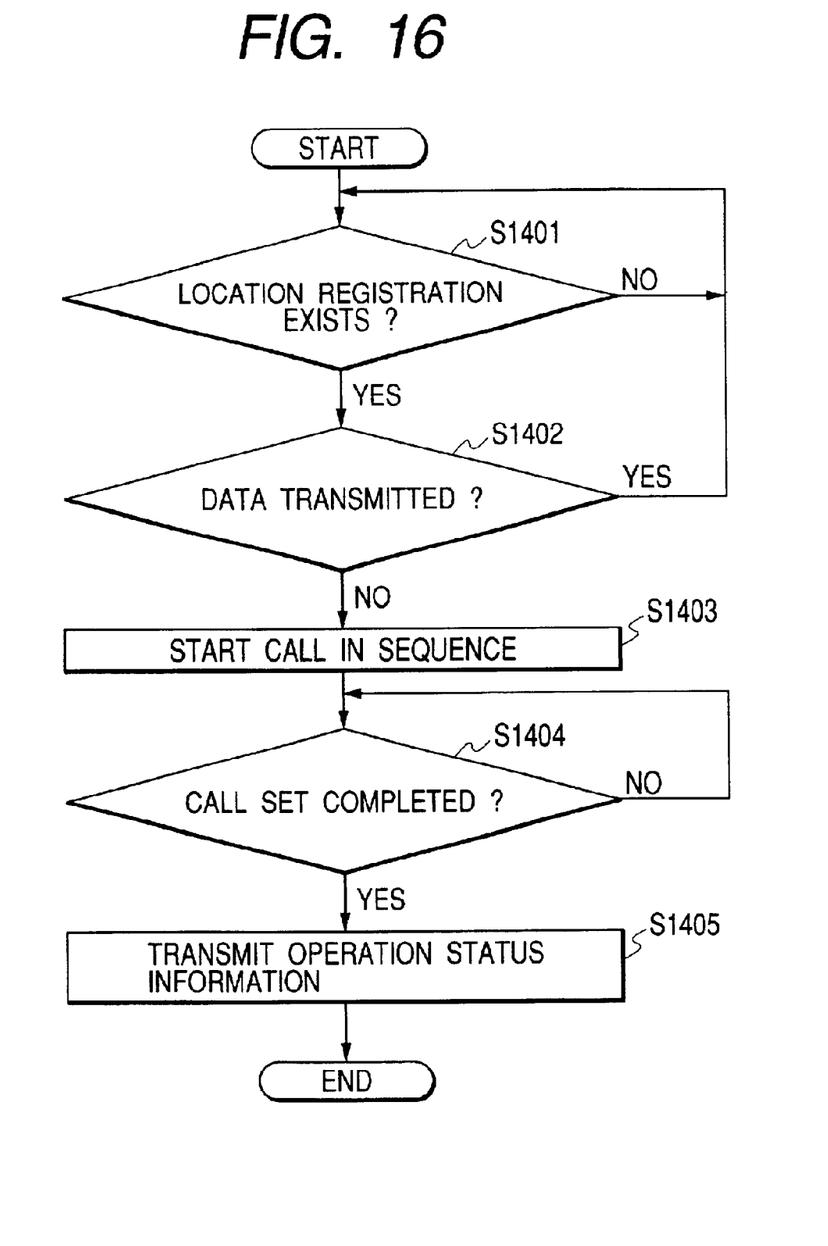
FIG. 16 is a flowchart of processes performed by a central management apparatus to implement the operation status notification function of the wireless data communications system according to the second embodiment of the present invention.

Specifically, as shown in FIG. 16, the central management apparatus 103 judges whether a wireless mobile terminal 110 has been registered in the service area of the central management apparatus 103 (Step S1401), and if one of the wireless mobile terminal 110 has been registered, the central management apparatus 103 judges whether operation status information has been transmitted to that wireless mobile terminal 110 (Step S1402). If it has not been yet, the central management apparatus 103 starts a call-in sequence (Step S1403). As shown in FIG. 15, when this call-in sequence is started, the central management apparatus 103 sends the call-in message M1301 to the appropriate wireless mobile terminal 110 and then executes a call-in sequence M1302 to M1312.

When the owner of the wireless mobile terminal 110 answers the call (Step S1404), a call-in sequence M1313 to M1314 is started and a transition to Communicating status takes place. Then, the central management apparatus 103 transmits the identification numbers which correspond to the operation status information yet to be transmitted, as information elements of a user information message M1315, to the wireless mobile terminal 110 all together (Step S1405). When the data transmission is completed, the central management apparatus 103 executes a disconnect sequence with respect to the wireless mobile terminal 110. When the disconnection is completed, the wireless mobile terminal 110 searches the operation status identification management table for the same operation status information (identification number) as the one received from the central management apparatus 103. Then, if the operation status information concerns the copy machine 106 whose operation status is requested by the user, a message, such as "Copy Machine 1: Available," which corresponds to the retrieved identification information is displayed on the liquid crystal display 306 of the wireless mobile terminal 110.

After the wireless mobile terminal 110 is registered in the service area of the central management apparatus 103, the same processes as those of the first embodiment described above are performed until the wireless mobile terminal 110 leaves the service area.

Consequently, when the wireless mobile terminal is located within the service area of the central management apparatus, it is notified of changes each time the operation status of the copy machine changes, but if the wireless mobile terminal leaves the service area once and then enters it again, identification numbers corresponding to the operation status information yet to be transmitted can be sent all together.

Incidentally, according to the above embodiments, the copy machines 106 whose operation status is requested to be displayed are selected on the wireless mobile terminals 110. Alternatively, the central management apparatus 103 may send a call-in message to the call pickup group to which the desired wireless mobile terminal 110 belong so that the wireless mobile terminals 110 will display messages unconditionally based on the identification number which represents the operation status and which is contained in the received call-in message.

Also, although the operation status notification from a remote management system is applied to PHS according to the embodiments described above, the present invention is not limited to that and can be applied to any wireless telephone apparatus regardless of whether it handles analog signals or digital signals, provided it consists of a plurality of handsets and a main phone which can register the handsets and connect to them.

Also, although the communication control apparatus and the central management system are implemented separately according to the embodiments described above, it is possible to assign the role of the central management system to one of the communication control apparatus connected to copy machines.

Also, although only the operation status of copy machines are reported according to the embodiments described above, it is possible to report the operation status of various apparatus including image processing apparatus (peripheral devices) such as printers. Besides, various modifications can be made without departing from the spirit and scope of the present invention.

As described above, the present invention eliminates the need to interrupt the work in progress on purpose and go to the installation locations of peripheral devices or other devices to check directly whether the devices are available. This results in improved working efficiency.

Also, the present invention makes it possible to take measures quickly in case of minor trouble with equipment and keep the equipment ready for use whenever necessary.

What is claimed is:

1. A system for managing an operation status of an equipment, comprising:
    a management apparatus which notifies a center about the operation status of the equipment;
    wherein said management apparatus comprises:
    a storage device which stores identification numbers corresponding to the operation statuses of the equipment;
    a discrimination device which discriminates the operation status of the equipment;
    a search device which searches said storage device for the identification number corresponding to the operation status discriminated by said discrimination device; and
    a calling device which calls another communication device with the identification number searched by said search device as a caller number.

2. The system according to claim 1, wherein said calling device calls by wireless.

3. The system according to claim 1, wherein said discrimination device discriminates the operation status in response to a charge of the operation status of the equipment.

4. The system according to claim 1, wherein
    said communication apparatus is a wireless communication apparatus,
    further comprising a transmitting device which transmits at a time the identification numbers corresponding to the operation statuses which have not been notified to said communication device, in response to said communication apparatus entering a wireless service area.

5. The system according to claim 4, wherein said transmitting device transmits said identification numbers at a time after enabling said communication apparatus and said management apparatus to be communicating.

6. The system according to claim 1, wherein
    said storage device stores the identification numbers corresponding to the operation statuses for each equipment.

7. The system according to claim 1, wherein said communication apparatus comprises:
    a storage device which stores operation statuses of the equipment and their identification numbers by associating with each other; and
    a display device which displays the operation status according to the identification number included in a calling signal by said calling device.

8. The system according to claim 7, wherein said display device also displays the identification number included in the calling signal by said calling device.

9. The system according to claim 7, wherein said storage device stores said operation statuses of the equipment and their identification numbers by associating with each other using a telephone directory function.

10. The system according to claim 1, wherein said management apparatus gathers the operation statuses of multiple pieces of equipment and notifies said center about them.

11. The system according to claim 10, wherein the operation statuses of multiple pieces of the equipment are gathered through wireless communication with connection devices connected with respective pieces of equipment.

12. A control apparatus for managing an operation status of equipment, comprising:
    a storage device which stores identification numbers corresponding to the operation statuses of the equipment;
    a discrimination device which discriminates the operation status of the equipment;
    a search device which searches said storage device for the identification number corresponding to the operation status discriminated by said discrimination device; and
    a calling device which calls another communication device with the identification number search by said search device as a caller number.

13. A method of managing an operation status of an equipment, comprising a step of:
    a storage step of storing identification numbers corresponding to the operation statuses of the equipment into a memory;

a discrimination step of discriminating the operation status of the equipment;

a search step of searching said storage device for the identification number corresponding to the operation status discriminated in said discrimination step; and a calling step of calling another communication device with the identification number searched in said search step as a caller number.

* * * * *